United States Patent [19]

Malik et al.

[11] Patent Number: 5,679,733
[45] Date of Patent: Oct. 21, 1997

[54] SOLID SOLUTION OF LOW MOLECULAR WEIGHT AND HIGH MOLECULAR WEIGHT HALS

[75] Inventors: Jan Malik, Bratislava; Sona Pallayova, Pezinok; Peter Danko, Bratislava, all of Slovakia

[73] Assignee: Clariant Finance (BVI) Limited, Tortola, Virgin Islands (Br.)

[21] Appl. No.: 466,501

[22] Filed: Jun. 6, 1995

Related U.S. Application Data

[62] Division of Ser. No. 206,477, Mar. 4, 1994, abandoned, which is a continuation of Ser. No. 70,597, Jun. 1, 1993, abandoned.

[30] Foreign Application Priority Data

Jun. 2, 1992 [GB] United Kingdom ............... 9211602

[51] Int. Cl.$^6$ ............... C08K 5/34; C09K 15/22
[52] U.S. Cl. ............... 524/99; 524/96; 524/100; 524/102; 524/103; 252/403
[58] Field of Search ............... 252/403; 524/99, 524/100, 102, 96, 103; 206/477

[56] References Cited

U.S. PATENT DOCUMENTS

| | | | |
|---|---|---|---|
| 4,251,435 | 2/1981 | Son et al. | 546/17 |
| 4,360,675 | 11/1982 | Nikles | 546/216 |
| 4,692,486 | 9/1987 | Gugumus | 524/100 |
| 4,778,837 | 10/1988 | Waterman et al. | 524/102 |
| 4,863,981 | 9/1989 | Gugumus | 524/97 |
| 4,985,479 | 1/1991 | Nagasaki et al. | 524/96 |
| 5,214,084 | 5/1993 | Ishii et al. | 524/96 |

FOREIGN PATENT DOCUMENTS

| | | |
|---|---|---|
| 0080431 | 6/1983 | European Pat. Off. . |
| 0252877 | 1/1988 | European Pat. Off. . |
| 0449685 | 10/1991 | European Pat. Off. . |
| 2202853 | 10/1988 | United Kingdom . |

OTHER PUBLICATIONS

GB Search Report for GB 9311233.2 [Date of Search Aug. 11, 1993].

Derwent Abstracts of: GB 2202853 EP 0449685 EP 0252877 EP 0080431 US 4985479 US 4863981 US 4692486.

*Primary Examiner*—Kriellion S. Morgan
*Attorney, Agent, or Firm*—Robert S. Honor; Gabriel Lopez

[57] ABSTRACT

A solid solution composition comprising
  a) a 2,2,6,6-tetraalkylpiperidinyl compound having a low molecular weight; and
  b) a 2,2,6,6-tetraalkylpiperidinyl compound having a high molecular weight
that have been mixed in the melt, is an excellent stabilizer for polymeric materials.

10 Claims, No Drawings

SOLID SOLUTION OF LOW MOLECULAR WEIGHT AND HIGH MOLECULAR WEIGHT HALS

This is a division of application Ser. No. 08/206,477 now abandoned, filed Mar. 4, 1994, which in turn is a continuation of application Ser. No. 08/070,597, filed Jun. 1, 1993, now abandoned.

Low molecular weight 2,2,6,6-tetraalkylpiperidinyl compounds (hereinafter low molecular weight HALS) and high molecular weight 2,2,6,6 tetraalkylpiperidinyl compounds (hereinafter high molecular weight HALS) are known individually to improve weathering properties, especially light fastness of polymeric materials.

We have surprisingly found that by mixing and melting together a low molecular weight HALS with a high molecular weight HALS to form a melt blend or solid solution thereof, the synergistic effect is significantly enhanced. The solid solution can be made by mixing the low and high molecular weight HALS together, forming a melt and then allowing the mixture to cool to form a solid solution of low and high molecular weight HALS.

This solid solution is preferably an amorphous material in which the low MW HALS is homogeneously dissolved in the high MW HALS.

According to the invention there is provided a solid solution (or melt blend) composition comprising
 a) a 2,2,6,6-tetraalkylpiperidinyl group containing compound having a low molecular weight (hereinafter component a); and
 b) a 2,2,6,6-tetraalkylpiperidinyl group containing compound having a high molecular weight (hereinafter component b)

that have been mixed in a melt.

Such solid solutions are the results of melt blending of component a) and b).

Preferably the ratio of component a) to b) is 1:1 to 1:20, more preferably 1:1 to 1:10, most preferably 1:2 to 1:9, especially about 1:4.

Preferably component a) is a monomeric compound (i.e. not oligomeric or not polymeric) containing at least one (preferably 1 to 4) 2,2,6,6-tetraalkylpiperidinyl groups.

Preferably component b) is an oligomeric or polymeric compound containing at least one 2,2,6,6-tetraalkylpiperidinyl group (preferably 1 to 4) per recurring polymer unit.

Preferably in this specification any 2,2,6,6-tetraalkylpiperidinyl group is N-unsubstituted- or N-substituted. Preferred N-substituted 2,2,6,6-tetraalkylpiperidinyl groups are N-acyl substituted- or N-alkylated-2,2,6,6-tetra-alkylpiperidinyl groups. Preferably acyl is a $CO-C_{1-4}$alkyl group and alkylated is $C_{1-4}$ alkylated, preferably methylated. Preferably any 2,2,6,6-tetraalkylpiperidinyl group is a 2,2,6,6-tetramethylpiperidinyl group.

Preferably the compounds of component a) have a molecular weight of 155–800, preferably 300–800.

Preferred high molecular weight 2,2,6,6-tetraalkylpiperidinyl compounds (component b) are those having a molecular weight of more than 1,000, more preferably 1000–20,000, most preferably 1500 to 15,000, especially 2000–5000.

More preferably component a) is selected from compounds of formula I to X

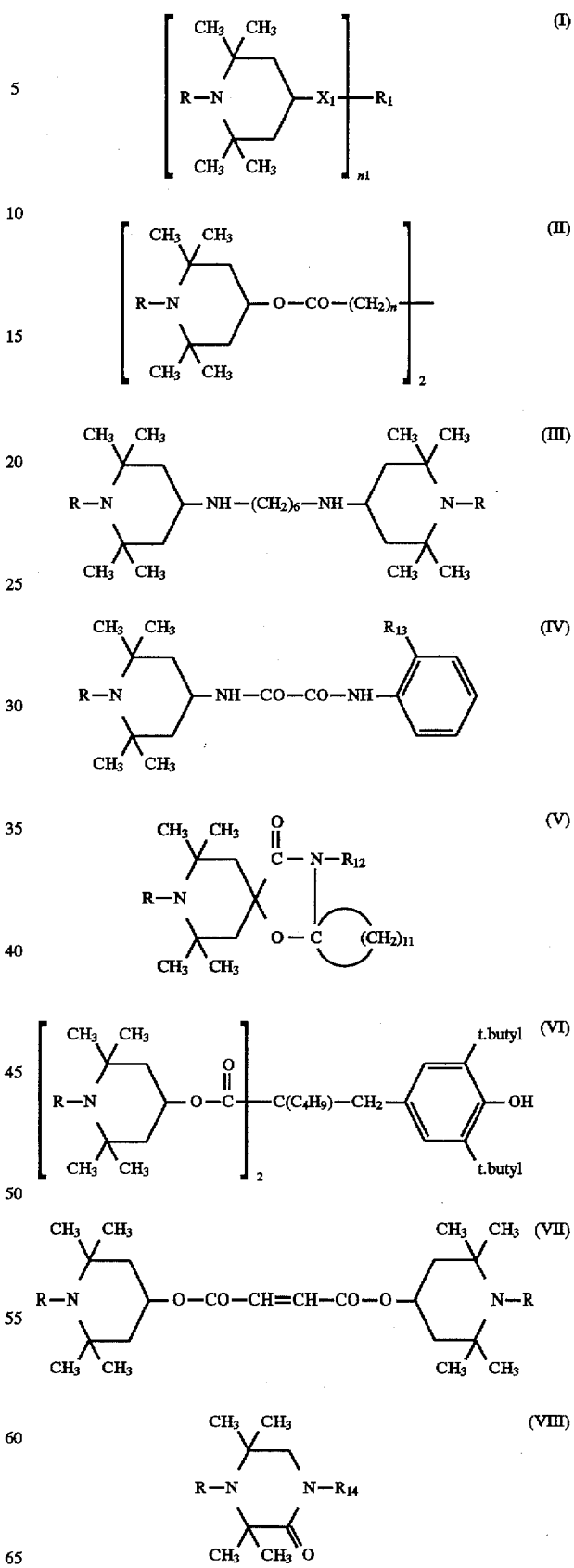

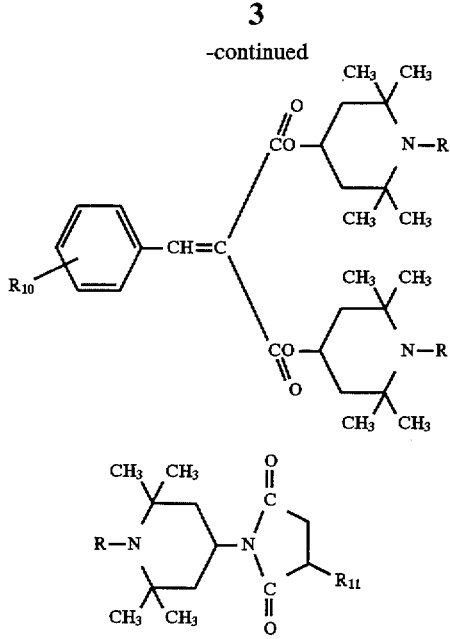

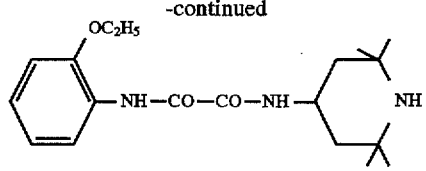

in which
n is a number from 1 to 4 inclusive,
$n_1$ is 1 or 4 (preferably 1 or 4, more preferably 1);
X is oxygen or $-N(R_3)$ where $R_3$ is hydrogen or $C_{1-4}$alkyl;
$R_1$ is the mono- or tetravalent group selected from a residue of a carboxylic acid and a residue of an amide;
$R_{10}$ is hydrogen, $C_{1-12}$alkyl or $C_{1-12}$alkoxy;
$R_{11}$ is hydrogen or $C_{1-14}$alkyl (preferably $C_{12}H_{25}$)
$R_{12}$ is hydrogen or $-CH_2CH_2COOCH_{1-14}$alkyl (preferably $CH_2CH_2COOC_{12}H_{25}$ or $CH_2CH_2COOC_{14}H_{27}$)
$R_{13}$ is $-O-(CH_2)_{1-3}-COOC_{1-12}$alkyl (preferably $-O-(CH_2)_{1-3}-COOC_{1-8}$alkyl);

R is selected from hydrogen, oxygen, $-OH$, $C_{1-8}$alkyl, $C_{1-8}$alkoxy, $-OCO-C_{1-8}$alkyl, $-O-CO$-phenyl and $-COR_5$; where $R_5$ is $-C(R_3)=CH_2$, phenyl, $-CO$-phenyl, $-NR_7R_8$, $-CH_2-C_6H_5$, $-COO-$ $C_{1-12}$alkyl or $-COOH$; $R_3$ is hydrogen or $C_{1-4}$alkyl; $R_7$ is hydrogen, $C_{1-12}$alkyl, $C_{5-6}$cycloalkyl, phenyl, phenyl$C_{1-4}$alkyl or $C_{1-12}$alkylphenyl and $R_8$ is $C_{1-12}$alkyl or hydrogen;

$R_{14}$ is $C_{1-8}$alkyl, $C_{2-4}$alkene or

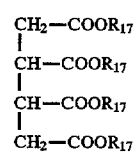

Most preferably component a) is selected from compounds of formula I, II and IV, especially compounds of formula I and II. Especially preferred are the compounds described as DASTIB 845, Tinuvin 770,

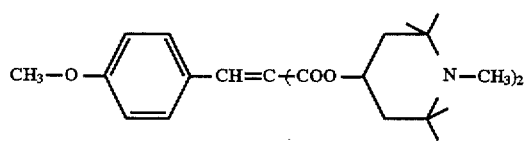

and

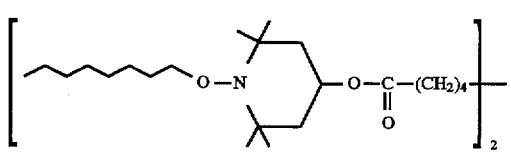

Specific compounds of component a) are selected from

Bis-(2,2,6,6-tetramethyl-4-piperidyl) sebacate (Tinuvin 770);
Bis-(1,2,2,6,6-pentamethyl-4-piperidinyl)-(3,5-ditert.butyl-4-hydroxybenzyl)butyl-propane dioate;
Bis-(1,2,2,6,6-pentamethyl-4-piperidinyl) sebacate;
8-Acetyl-3-dodecyl-7,7,9,9-tetramethyl-1,3,8-triazaspiro-(4,5)-decane-2,4-dione;
Butanedioic acid-bis-(2,2,6,6-tetramethyl-4-piperidinyl) ester;
Tetrakis-(2,2,6,6-tetramethyl-4-piperidyl)-1,2,3,4-butane tetracarboxylate;
7-oxa-3,20-diazadispiro(5.1.11.2) heneicosan-20-propanoic acid, 2,2,4,4-tetramethyl-21-oxo, dodecyl ester;
N-(2,2,6,6-tetramethyl-4-piperidinyl)-N'-amino-oxamide;
o-t-amyl-o-(1,2,2,6,6-pentamethyl-4-piperidinyl)-monoperoxi-carbonate;
β-alanine, N-(2,2,6,6-tetramethyl-4-piperidinyl), dodecylester;
ethanediamide, N-(1-acetyl-2,2,6,6-tetramethylpiperidinyl)-N'-dodecyl;
3-dodecyl-1-(2,2,6,6-tetramethyl-4-piperidinyl)-pyrrolidin-2,5-dione;
3-dodecyl-1-(1,2,2,6,6-pentamethyl-4-piperidinyl)-pyrrolidin-2,5-dione;
3-dodecyl-1-(1-acetyl,2,2,6,6-tetramethyl-4-piperidinyl)-pyrrolidin-2,5-dione; ("Sanduvor" 3058)
4-benzoyloxy-2,2,6,6-tetramethylpiperidine;
1-[2-(3,5-di-tert.butyl-4-hydroxyphenylpropionyloxy)ethyl]-4-(3,5-di-tert.-butyl-4-hydroxylphenyl propionyloxy)-2,2,6,6-tetramethyl-piperidine;
2-methyl-2-(2",2",6",6"-tetramethyl-4"-piperidinylamino)-N-(2',2',6',6'-tetra-methyl-4'-piperidinyl) propionylamide;
1,2-bis-(3,3,5,5-tetramethyl-2-oxo-piperazinyl) ethane;
4-oleoyloxy-2,2,6,6-tetramethylpiperidine;

"Tinuvin" 123, a compound of the formula

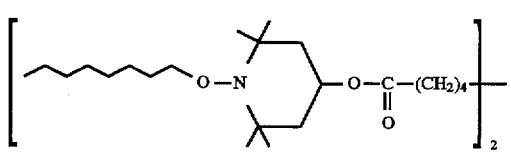

"Mixxim" HALS 67(ADK-STAB LA 67) and Mixxim HALS 62 (ADK-STAB LA 62), a compound of the formula $CH_2-COOR_{17}$
$|$
$CH-COOR_{17}$
$|$
$CH-COOR_{17}$
$|$
$CH_2-COOR_{17}$ in which each $R_{17}$ is $C_{13}H_{27}$ or

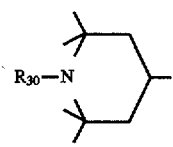

where $R_{30}$ is hydrogen or methyl;

"Hostavin" N 20, a compound of the formula

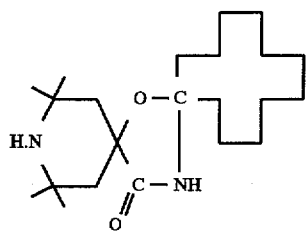

Topanex 500 H and 516 H from ICI, a compound of the formula

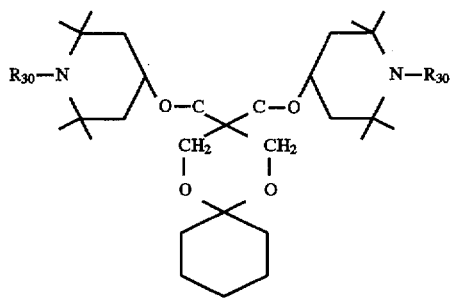

where both groups $R_{30}$ are hydrogen (500H) or both groups $R_{30}$ are —$CH_3$ (516H);

"DASTIB" 845, a compound of the formula

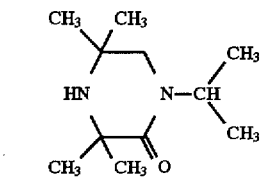

where n' is 14–16;

This product is described in Swiss Patent 651,580

"Goodrite" 3150, a compound of the formula

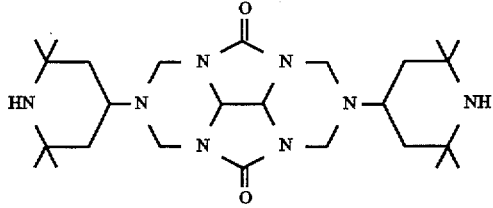

"Uvinul" 4049, a compound of the formula

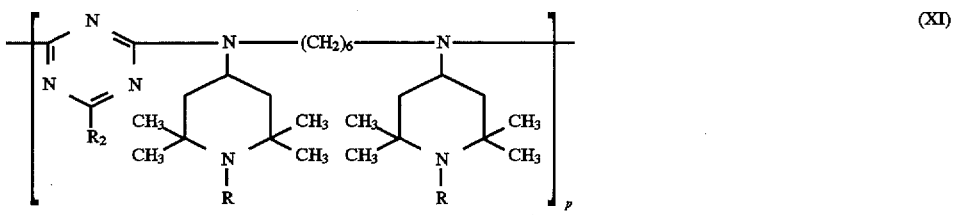

More preferably component b) is selected from compounds of formulae XI to XIX

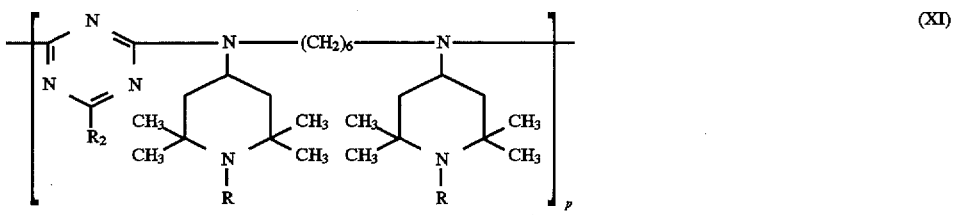
(XI)

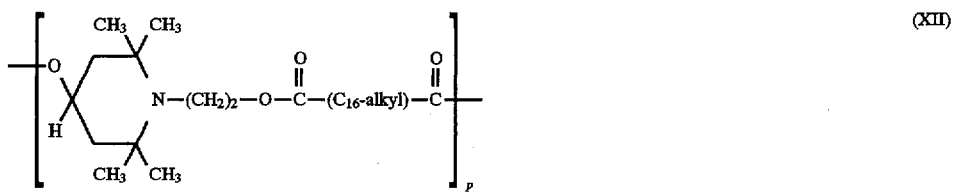
(XII)

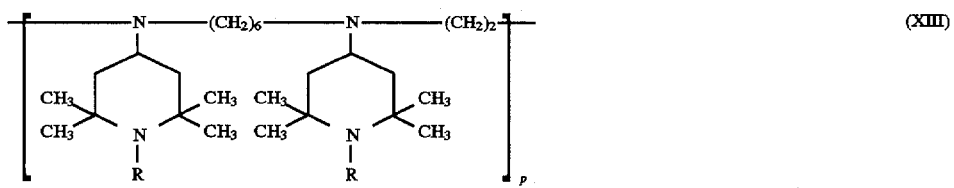
(XIII)

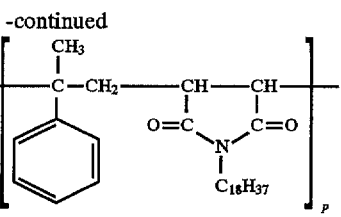
(XIV)
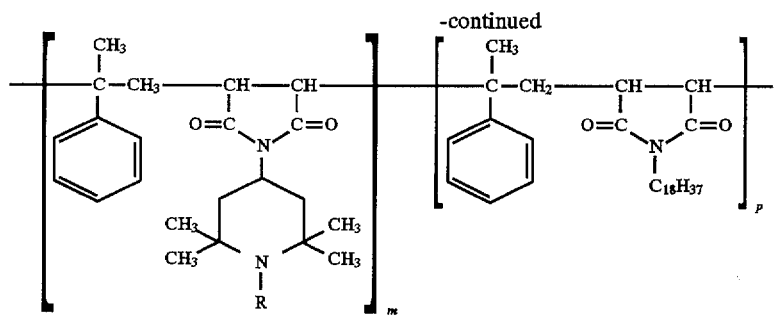
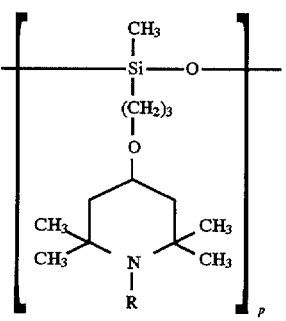
(XV)
$R_{15}NH(CH_2)_3-N(R_{15})-(CH_2)_2-N(R_{15})-(CH_2)_3-NHR_{15}$ (XVI)
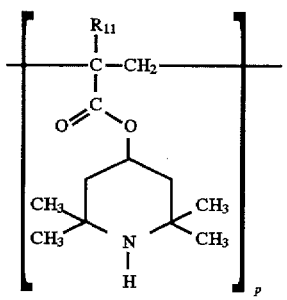
(XVII)
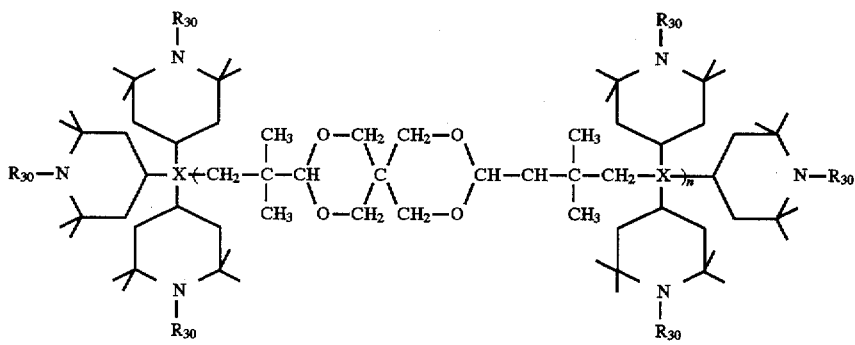
known as ADK STAB LA-63+LA-68, where n is 1 to 4; and where each $R_{30}$ is hydrogen (LA-68) or —$CH_3$ (LA-63)

Hostavin N30

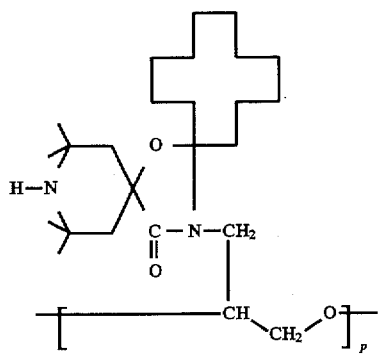

where
p=4 to 30, preferably 4 to 20, more preferably 4 to 10;
m has a significance of p independently of p; and
$R_{11}$ is hydrogen or $C_{1-4}$alkyl;
$R_2$ is —N($C_{1-12}$alkyl)$_2$; —NH $C_{1-12}$alkyl or morpholino
$R_{15}$ is

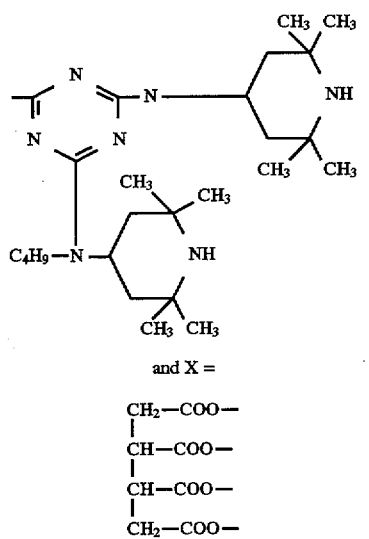

and X =

CH$_2$—COO—
|
CH—COO—
|
CH—COO—
|
CH$_2$—COO— where each $R_{30}$ is hydrogen (LA-68) or —CH$_3$ (LA-63)
Specific compounds of component b) are selected from:

1,3,5-triazine-2,4,6-triamine-N',N'''-(ethanediylbis-(4,6-bis-(butyl(1,2,2,6,6-pentamethyl-4-piperidinyl-amino)-1,3,5-triazine-2-yl)-iminopropanediyl)-[N',N''-dibutyl-N',N''-bis-(1,2,2,6,6-pentamethyl-4-piperidinyl)-;
Poly-methylpropyl-3-oxy-[4-(2,2,6,6-tetramethyl)-piperidinyl]-siloxane;
Octa decene-(N-(2,2,6,6-tetramethylpiperidinyl-4-N-maleic imido oxalic acid diamide) copolymer;
Poly-[(6-morpholino-S-triazine-2,4-diyl)-[2,2,6,6-tetramethyl-4-piperidinyl)-hexa-methylene-[2,2,6,6-tetramethyl-4-piperidinyl)-imino]];

The polymeric reaction product of α-methylstyrene, N-(2,2,6,6-tetramethyl-piperidinyl-4-)-maleimide and N-stearyl-maleimide;

"Chimassorb" 905, defined in CAS - Reg. Nr. 107043-87-8

"Chimassorb" 944, a compound of the formula

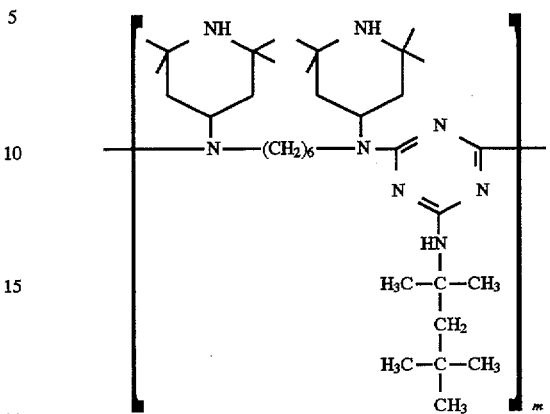

"Tinuvin" 622, a compound of the formula

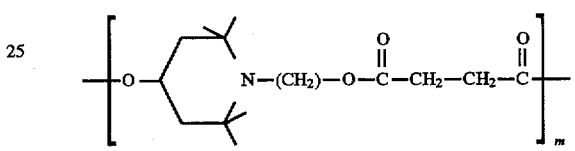

"Tinuvin" 079, a compound of the formula

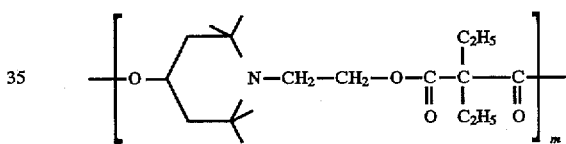

Uvasil 299 from Enichem, a compound of the formula

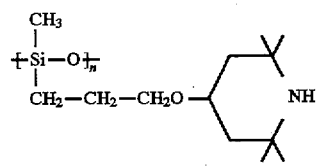

"Spinuvex" A 36, a compound of the formula

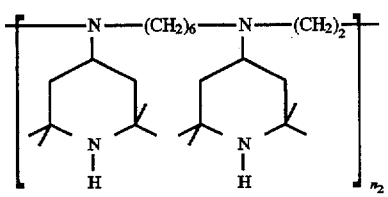

$n_2$=2–20

"Lowlite" 62

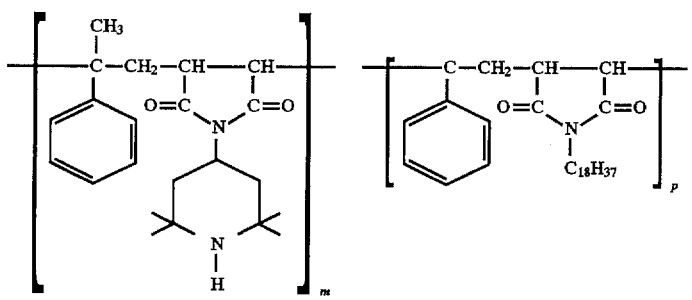

Cyasorb UV 3346

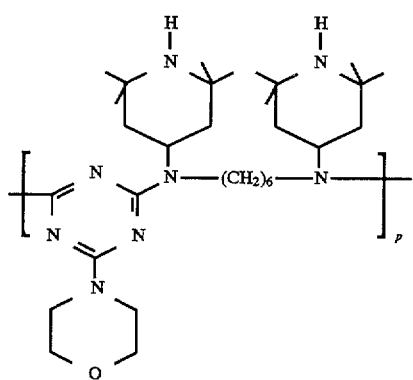

and "Dastib" 1082, a compound of the formula

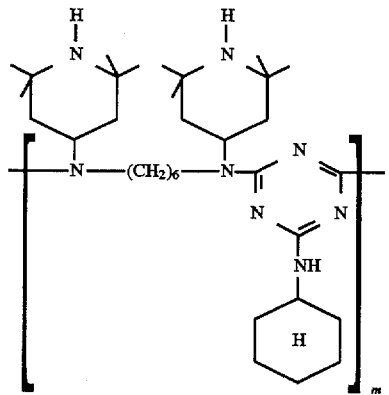

where p is 4 to 30 and m is 4 to 30 as defined above.

Most preferred compounds of component b) are compounds of formula XI.

Especially preferred compounds of component b) are those defined as Dastib 1082, Chimassorb 944 and Cyasorb 3346.

The ratio of components a) to b) may vary within the limits of the mutual solubility of the components. However, preferably component a) should preferably be soluble in component b) to give a true solution, when in the melt.

Preferably R is R' where R' is hydrogen, $C_{1-8}$alkyl, —O—$C_{1-8}$alkyl or —CO—$C_{1-8}$alkyl, more preferably R" when R" is hydrogen, —$CH_3$, —$OCH_3$ or —$COCH_3$.

Preferably $R_1$ is $R_1'$ where $R_1'$ is —(CO)—$_{n1}R_{40}$ or —(CO—CO—NH)$_{n1}$—$R_{40}$, where $R_{40}$ is $C_{1-22}$ alkyl or phenyl unsubstituted or substituted by 1 to 3 groups selected from $C_{1-22}$alkyl or $C_{1-22}$ alkoxy For the avoidance of doubt, a residue of a carboxylic acid group is an acyl group, for example —CO—$C_{1-22}$alkyl, —CO—$R_5$, where $R_5$ is phenyl unsubstituted or substituted by 1 to 3 groups selected from $C_{1-22}$alkyl or $C_{1-22}$ alkoxy.

Solid solution compositions according to the invention may be prepared by i) mixing 1 part (by weight) of component a) with 1–20 parts (by weight) of component b) followed by ii) melting the mixture to form a solution, and iii) cooling the solution to form a solid solution.

Preferably melting is carried out at 100°–300° C., more preferably 150°–250° C.

Where a symbol appears more than once in a formula, its significances are independent of one another unless indicated to the contrary.

Compounds of formula I to XIX are known or may be made from known compounds by known methods.

Further, according to the invention there is provided a polymeric composition comprising a polymeric material and a solid solution composition according to the invention.

Preferably the amount of solid solution composition present is 0.01 to 5%, more preferably 0.02–2% based on the amount of polymeric material.

Further additives which may be added to a polymeric composition according to the invention include antioxidants, such as sterically hindered phenols, secondary aromatic amines or thioethers, such as those described in "Kunststoffe-Additive" Gächter/Müller, 3rd Ed., 1990, pp 42–50, the contents of which is incorporated herein by reference; acid scavengers such as sodium-, magnesium- or calcium stearates or lactates, hydrotalcite, alkoxylated or hydroxylated amines; U.V. absorbers (e.g. 2-(2'-hydroxyphenyl)-benztriazoles, 2-hydroxyphenyl-1,3,5-triazines, 2-hydroxy-benzophenones, 1,3-bis-(2-hydroxybenzoyl)-benzene-salicylates, 2-hydroxyphenyl-1,3,5-triazines, cinnamates or oxalic acid diamides); U.V. quenchers (e.g. benzoates or substituted benzoates), antistatic agents, flameproofing agents, softeners, plasticizers, lubricants, guard agents, metal deactivators, complexants, biocides, fungicides, nucleating agents, fillers, pigments and other impact modifiers.

The solid solution composition hereinabove defined may be incorporated by known methods into the polymeric material to be stabilized. Of particular importance is blending of the compositions with thermoplastic polymers in the melt, for example in a melt blender or during the formation of shaped articles, including foils, films, tubes, containers, bottles, fibres and foams by extrusion, injection moulding, blow moulding, spinning or wire coating.

It is not essential for the polymeric material to be fully polymerised before mixing with solid solution compositions according to the invention. The solid solution may be mixed with monomer, prepolymer or precondensate, and the polymerisation reaction carried out subsequently. This will, of course, be the preferred method of incorporation of the solid solutions into thermosetting polymers, which cannot be melt blended.

Polymeric materials which may be stabilized by a composition according to the invention more specifically include homopolymers, copolymers and polymer blends of:

cellulose acetate; cellulose acetatobutyrate; cellulose acetopropionate; cresol-formaldehyde resins; carboxymethylcellulose; cellulose nitrate; cellulose propionate; casein plastics; casein-formaldehyde resins; cellulose triacetate; ethyl cellulose; epoxy resins; methyl cellulose; melamineformaldehyde resins; polyamide; polyamidimide; polyacrylonitrile; polybut-1-ene; polybut-2-ene; polybutylacrylate; poly(butylene-terephthalate); polycarbonate; poly(chlorotrifluoro-ethylene); poly-(diallylphthalate); polyethylene; chlorinated polyethylene; polyether ketone; polyetherimide; polyethylene-oxide; polyethersulfone; poly(ethyleneterephtha-late); polytetrafluoroethylene; phenolformaldehyde resins; polyimide; polyisobutylene; polyisocyanurate; polymethacrylimide; polymethylmethacrylate; poly(4-methylpent-1-ene); poly($\alpha$-methylstyrene); polyoxymethylene; polyacetal; polypropylene; polyphenyleneether; polyphenylenesulphide; polyphenylene-sulfone; polystyrene; polysulfone; polyurethane; polyvinylacetate; polyvinyl-alcohol; polyvinylbutyral; chlorinated polyvinylchloride; polyvinylidenefluoride; polyvinylidenechloride; polyvinyl-fluoride; polyvinylchloride; polyvinylformaldehyde; polyvinylcarbazole; polyvinyl-pyrrolidone; silicon polymers; saturated polyesters; urea-formaldehyde resins; unsaturated polyesters; polyacrylates; polymeth-acrylate; polyacrylamide; maleinate resins; phenolic resins; aniline resins; furane resins; carbamide resins; epoxide resins and silicon resins.

Examples of suitable copolymers include: acrylonitrile/butadiene/acrylate; acrylonitrile/butadiene/styrene; acrylonitrile/methylmethacrylate; acrylonitrile/styrene/acrylic ester; acrylonitrile/ethylene propylenediene/styrene; acrylonitrile/chlorinated polyethylene/styrene; ethylene/propylene; ethylene/propylenediene; ethylene/vinylacetate; ethylene/vinylalcohol; ethylene/tetrafluoroethylene; tetrafluoroethylene/hexafluoropropylene; methacrylate/butadiene/styrene; melamine/phenolformaldehyde; polyester polyamide; perfluoro-alkoxyalkane; styrene/butadiene; styrene/maleic acid anhydride; styrene/$\alpha$-methylstyrene; vinylchloride/ethylene/methacrylate; vinylchloride/ethylene/vinylacetate; vinylchloride/methylmethacrylate; vinylchloride/octylacetate; vinylchloride/vinylacetate and vinylchloride/vinylidenechloride.

More preferred polymeric materials include plastics materials, for example, polyethylene, polypropylene, ethylene/propylene copolymers, polyvinyl chloride, polyester, polyamide, polyurethane, polyacrylonitrile, ABS, terpolymers of acrylates, styrene and acrylonitrile, styrene/acrylonitrile and styrene/butadiene. Other plastics materials such as polybutylene, polystyrene, chlorinated polyethylene, polycarbonate, polymethylmethacrylate, polyphenylene oxide, polypropylene oxide; polyacetals, phenol/formaldehyde resins and epoxy resins may also be used. Preferred plastic materials are polypropylene, polyethylene, ethylene/propylene copolymers and ABS. Natural polymers, for example, natural rubber may also be stabilized, as may lubricating oils containing polymeric material.

Most preferred polymeric materials which may be improved by the composition according to the invention are polyolefins such as polyethylene (e.g. high density polyethylene, low density polyethylene, linear low density polyethylene, or medium density polyethylene), polybutylene, poly-4-methylpentene and copolymers thereof.

The solid solution compositions according to the invention are especially suitable for use in polyolefins and their copolymers prepared by using processing catalysts known as Generation II to Generation V catalysts and which may or may have not (preferably have not) been subjected to a catalyst removal step.

By the term "catalyst removal step" is meant a step which comprises, for the purpose of positively removing the catalyst residue contained in the polymerized polyolefins, treating the polyolefins with compounds which can react with the catalyst residue and inactivate or solubilize the residue, for example alcohols or water, and then removing the inactivated or solubilized catalyst residue by physical means such as filtration, washing, and centrifuging.

Thus, in the case of suspension polymerization, the step of separating the resulting polymer from a dispersion medium such as a solvent or a liquified monomer does not fall under the above-mentioned definition of the catalyst residueremoval step, although the catalyst dissolved in the dispersion medium may be removed at the separation step. The step of adding a small amount of catalyst poisons such as ethers, alcohols, ketones, esters and water to the resulting polymer suspension with a gas such as steam or nitrogen to remove the dispersion medium also does not fall under the above-mentioned definition of the catalyst residue-removal step.

What is meant by Generation I catalysts is titanium halide catalysts and an organo aluminium compound or an organo aluminium halide.

What is meant by Generation II catalysts is Generation I catalysts supported on an organo magnesium compound or based on an organo chromium compound supported on $SiO_2$.

What is meant by a Generation III catalyst is a Zieglertype complex catalyst supported on a halogen-containing magnesium compound.

What is meant by a Generation IV catalyst is a Generation III catalyst with a silane donor.

What is meant by a Generation V catalyst is a bis-indenyl organo titanium compound supported on alumoxane or is a bis-cyclopentadienyl-titanium halide activated by aluminium alkyl compounds.

Further generations of highly specific catalysts, especially useful for manufacturing highly stereoregular polyolefins, which are presently under development, belong in the sense of the present invention also to the aforementioned generations of supported catalyst systems. Examples of such highly stereoregular polyolefins are syndiotactic polypropylene, isotactic stereoblock polymers, isotactic polypropylene containing steric defects distributed along the polymer chain (so called anisotactic polypropylene) or stereoirregular stereoblock polymers.

Because of to the rapid progress in the development of supported newer generation catalyst systems (eg the metallocene catalysts), the commercial significance of these polymers with novel, highly-interesting properties is steadily increasing. However, residues of such further catalyst generations, can also cause disadvantageous properties in the polymer, if they contain metals of the 3d, 4d and 5d series of the periodic system supported analogously to the earlier catalyst generations, and if such residues are not removed physically and are still present in the polymer even in a deactivated form.

These Generations of Catalysts are described in the Twelfth Annual International Conference on Advances in the stabilization and Controlled Degradation of Polymers, held in Luzern, Switzerland, 21–23 May 1990 in an article on pages 181 to 196 inclusive by Rolf Mülhaupt entitled "New Trends in Polyolefin Catalysts and Influence on Polymer Stability". The contents of this article is incorporated herein by reference and especially Table I on page 184 describing the Generation of Catalysts:

and/or polyester resins (which if desired, may be crosslinked with melamine/formaldehyde resins, epoxide resins or polyisocyanates) containing a solid solution compositions a hereinabove described optionally together with an acid catalyst or compound capable of releasing an acid catalyst.

The concentration of a mixture of a solid solution composition according to the invention employed a polymeric material is suitably 0.01 to 8% by weight, preferably 0.02% to 1% by weight and gives a clear improvement in the light- and weather-stability of organic pigments in stoving finishes

TABLE I

| | Polyolefin Catalyst Evolution | | | | |
|---|---|---|---|---|---|
| Generation | Example | Cat. Act. (gPP/gTi h atm) | % Act. Ti | Stereoreg. (% hept. ins.) | Process Technology |
| I. | $TiCl_4/AlR_3$ | 40 | 0.01 | 45% | removal of cat. residues and atactic PP |
| | $TiCl_3/AlEt_2Cl$ | 30 | 0.1 | 92% | removal of catalyst residues |
| II | $Mg(OEt_2)/TiCl_4/AlR_3$ | 40000 | | 50% | no removal of cat. residues |
| | $SiO_2/Cp_2Cr$ | 40000 | HDPE | | (mainly HDPE/LLDPE) |
| III | Mod. $TiCl_3$ cat. | 5000 | 1 | 95% | no purification |
| | $MgCl_2/TiCl_4/AlR_3$-ester donor | 20000 | 10 | 92% | |
| IV | $MgCl_2/TiCl_4/AlR_3$-silane donor | 40000 | 18 | 99% | no purification no extrusion |
| V | Bis-indenyl-$TiR_2$ on $(AlCH_3O)_2$ | 40000 | 100 | 99% | novel PPs, narrow MWD | in which R is an organo group; HDPE is high density polyethylene, LLDPE is linear low density polyethyene, Cp is cyclopentadienyl, Et is ethyl, PP is polypropylene and MWD is molecular weight distribution.

Compositions according to the invention may be added before, during or after the polymerization step and may be added in solid or molten form, in solution preferably as a liquid concentrate containing from 10 to 80% by weight of the composition and 90 to 20% by weight of a solvent, or as a solid masterbatch composition containing 10 to 80% (more preferably 40 to 70%) by weight of the composition and 90 to 20% (more preferably 60 to 30%) by weight of a solid polymeric material which is identical or compatible with the material to be stabilized.

Compositions according to the invention may be incorporated by other known methods into the polymeric material to be stabilized. Each method includes a dry-blending of the compositions according to the invention with the polymer fluff or coating shaped polymer particles, e.g. polymer spheres, with the present compositions in the form of a molten liquid, a solution or suspension/dispersion. Of particular importance is the blending of the compounds with thermoplastic polymers in the melt, for example in a melt blender or during the formation of shaped articles, including films, tubes, fibres and foams by extrusion, injection moulding, blow moulding, roto-moulding, spinning or wire coating. The compositions according to the invention are particularly useful in polypropylene and polyethylene articles of every type.

Further, according to the invention there is provided a method for stabilising a coating composition based on polyurethane, acrylic, alkyd and/or polyester resins (which if desired, may be crosslinked with melamine/formaldehyde resins, epoxide resins or polyisocyanates) against the degrading effects of heat and light, which comprises incorporating into the resin a solid solution composition as hereinabove described, optionally together with an acid catalyst or compound capable of releasing an acid catalyst.

Further, according to the invention there is provided a coating composition based on polyurethane, acrylic, alkyd as well as a reduction in the tendency to hairline cracking and loss of gloss as the result of weathering. This is also observed in metallic finishes in which solid solution compositions according to the invention are incorporated, and excellent long-term stability of the clear top coat of two layer metallic finishes is obtained. In such finishes, the solid solution compostion may be added to the metallic undercoat, the clear top coat or both, preferably only to the clear top coat. The surface to be finished may be undercoated or primed with primer coatings as is customary in the art of surface coating.

Other antioxidants may be added to polymeric material either before, at the same time as or after (but before polymerisation occurs) the addition of a composition according to the invention.

Examples of suitable antioxidants include benzofuran-2-ones, indolin-2-ones and sterically hindered phenols, sulphur and phosphorus containing compounds and mixtures thereof.

Preferred sterically hindered phenols include β-(4-hydroxy-3,5-ditert.butyl-phenyl)-propionyl stearate, methane tetrakis-(methylene-3(3',5'-ditert-butyl-4-hydroxyphenyl)-propionate), 1,3,3-tris-(2-methyl-4-hydroxy-5-tert-butylphenyl)butane, 1,3,5-tris (4-tert.butyl-3-hydroxy-2,6-di-methylbenzyl)-1,3,5-triazinyl-2,4,6(1H,3H,5H)-trione, bis-(4-tert.butyl-3-hydroxy-2,6-di-methylbenzyl) dithiolterephthalate, tris(3,5-ditert.butyl-4-hydroxybenzyl) isocyanurate, the triester of beta-(4-hydroxy-3,5-ditert.butylphenyl)propionic acid with 1,3,4-tris-(2-hydroxyethyl)-5-triazinyl-2,4,6(1H,3H,5H)-trione, bis (3,3-bis-(4'-hydroxy-3-tert.butylphenyl)-butyric acid) glycol ester, 1,3,5-tri-methyl-2,4,6-tris-(3,5-ditert.butyl-4-hydroxy-benzyl)benzene, 2,2'-methylene-bis-(4-methyl-6-tert.butylphenyl) terephthalate, 4,4-methylene-bis-(2,6-ditert-butylphenol), 4,4'-butylidine-bis-(tert.butylmetacresol), 2,2'-methylene-bis-(4-methyl-6-tert.-butyl)-phenol, 1,3,5-tris-(3,5-di-t-butyl-4-hydroxyphenyl)-isocyanurate and 1,1,3,tris-(5-tert.butyl-4-hydroxy-2-methylphenyl)-butane.

Preferred sulphur-containing antioxidative co-stabilizers which may be used include di-tridecyl-3,3-thiodipropionate, distearyl-3,3-thiodipropionate, di-lauryl-3,3-thiodipropionate, methane tetrakis (methylene-3-hexyl-thiopropionate), methane tetrakis (methylene-3-dodecylthiopropionate) and dioctadecyl disulphide.

Preferred phosphorus-containing co-stabilizers which may be used include trinonylphenyl phosphite, 4,9-distearyl-3,5,8,10-tetraoxa-diphosphaspiroundecane, tris-(2,4-ditert.butylphenyl) phosphite, trilauryl phosphite, bis(2,6-di-t.butyl-4-methylphenyl)pentaerythrityl-diphosphite, bis(2,4-di-t.butylphenyl)pentaerythrityl-diphosphite, distearylpentaerythrityl diphosphite and tetrakis-(2,4-ditert.butylphenyl)-4,4'-biphenylene diphosphonite.

Other additives which may be added to polymeric compositions according to the invention include aminoaryl compounds, U.V. stabilisers and antistatic agents, flameproofing agents, softeners, nucleating agents, metal deactivators, biocides, impact modifiers, fillers, pigments and fungicides.

Preferred aminoaryl compounds include N,N'-dinaphthyl-p-phenylene diamine and N,N'-hexamethylene-bis-3-(3,5-ditert.butyl-4-hydroxy phenyl)-propionamide.

Preferred U.V. stabilisers include U.V. absorbers (e.g. 2-(2'-hydroxyphenyl)-benztriazoles, 2-hydroxybenzophenones, 1,3-bis-(2'-hydroxybenzoyl-)benzene salicylates, cinnamates and oxalic acid diamides; U.V. quenchers such as benzoates and substituted benzoates; and hindered amine light stabilisers (for example N-unsubstituted, N-alkyl or N-acyl substituted 2,2,6,6-tetraalkyl piperidine compounds) other than those of the invention.

Preferably a compound of formula XX

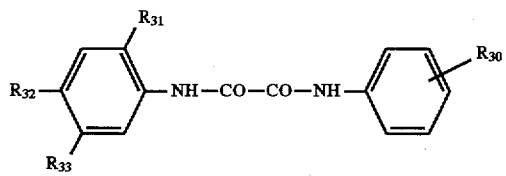

in which $R_{30}$ is $C_{6-22}$ alkyl or $C_{6-22}$ alkoxy;

$R_{31}$ and $R_{32}$ independently are selected from hydrogen, $C_{1-8}$ alkyl, $C_{1-12}$ alkoxy, $CH_{1-12}$ alkylthio, phenoxy and phenylthio provided that only one of $R_{31}$ and $R_{32}$ is alkylthio, phenoxy or phenylthio; and $R_{33}$ is hydrogen or $C_{1-8}$ alkyl; is added to a solid solution composition according to the invention.

The solid solution compositions according to the invention are equally suitable for use in organic polymer-containing coatings, particularly powder coatings e.g. as microsuspensions.

The solid solution composition according to the invention may be added to the finish at any stage in its manufacture, and may be added in solid form.

The solid solution compositions according to the invention are added to the liquid or powder finishes before stoving or hardening.

The solid solution composition according to the invention may also be used in photopolymeric substrates containing photoinitiators for photopolymerisation.

The invention will now be illustrated by the following Examples in which all parts and percentages are by weight and all temperatures are in °C. The amount of light stabilizer is based on the solids weight in the polymer.

EXAMPLES

A number of solid solutions are prepared with the components and proportions shown in Table 1. The materials used are:

A-1.1 "Dastib" 845

$$HN \!\!-\!\!\!\!\bigcirc\!\!-\!\!OC\!-\!(CH_2)_{p_1}\!-\!CH_3 \quad \overset{O}{\|}$$

where $p_1$ is 14–16

A-2.1 "Tinuvin" 770

$$\left[HN\!\!-\!\!\!\!\bigcirc\!\!-\!\!O\!-\!\!\underset{\|}{\overset{\|}{C}}\!\!-\!\!(CH_2)_8\right]_2$$

B-1.1 "Dastib" 1082 defined above
B-1.2 "Chimassorb" 944 defined above
B-1.3 "Cyasorb" U V 3346 (=Cyagard UV 3346) a compound of formula XI above with $R_2$=morpholine and R=H.

In the case of No. S1,90 parts of compound B-1.1 is melted at 190° C. and 10 parts of compound A-1.1 are added. The mixture is mixed thoroughly for 30 minutes and is then cooled to room temperature over 1 hour to give a solid solution.

Preparation of the other solid solution compositions S2–S12 in Table 1 is by a similar method.

For the purposes of comparison, a number of simple mixtures of the materials listed hereinafter are made, using the same material and the same proportions. Thus, a simple mixture of B-1.1 and A-1.1 in the proportion of 90:10 is given the designation M1. Similarly M2 is the mixture corresponding to solid solution S2 and so on.

TABLE 1

| No. | Components | Ratio | Melting temperature [°C.] |
|-----|------------|-------|---------------------------|
| S1  | A-1.1:B-1.1 | 10:90 | 122–129 |
| S2  | A-1.1:B-1.1 | 15:85 | 106–115 |
| S3  | A-1.1:B-1.1 | 20:80 | 90–99   |
| S4  | A-1.1:B-1.1 | 25:75 | 77–85   |
| S5  | A-1.1:B-1.1 | 30:70 | 64–69   |
| S6  | A-2.1:B-1.1 | 10:90 | 132–141 |
| S7  | A-2.1:B-1.1 | 25:75 | 91–103  |
| S8  | A-2.1:B-1.2 | 20:80 | 75–83   |
| S9  | A-1.1:B-1.2 | 10:90 | 85–95   |
| S10 | A-1.1:B-1.2 | 25:75 | 45–55   |
| S11 | A-1.1:B-1.3 | 10:90 | 80–90   |
| S12 | A-1.1:B-1.3 | 15:85 | 79–89   |

| Individual compound | Melting temperature °C. |
|---------------------|--------------------------|
| A-1.1 | 28–32   |
| A-2.1 | 81–83   |
| B-1.1 | 172–185 |
| B-1.2 | 116–130 |
| B-1.3 | 112–125 |

Application Example A

Light stabilization and thermal stabilization efficiency is tested in polypropylene (compression molded films 0.1 mm, 0.2% wt of solid solution or mixture).

Light stability is tested on a Xenotest 450 apparatus and thermal stability in an oven at 135° C. The results are shown in Table 2

TABLE 2

| Stabilizer | Δ CO after 4560 h | oven Tb (days) |
|---|---|---|
| S1 | 0.107 | 151 |
| M1 | 0.205 | 22 |
| S2 | 0.051 | 358 |
| M2 | 0.186 | 319 |
| S3 | 0.045 | — |
| M3 | 0.138 | — |
| S4 | 0.051 | 272 |
| M4 | 0.060 | 142 |
| S5 |  | 507 |
| M5 |  | 108 |

Application Example B

Stabilization of polypropylene fibers is tested.

Samples of polypropylene fibers (6.7 dtex), stabilized with 0.2% wt. of solid solution or mixture by exposure in a "Xenotest" 450 apparatus at a b.p.t. of 45° C., and a relative humidity of 60%.

Criterion: time taken for tensile strength to decrease by 50% ($T_{50}$).

The results are shown in Table 3.

TABLE 3

| Sample | $T_{50}$ (h) |
|---|---|
| S1 | 1010 |
| M1 | 940 |
| S3 | 800 |
| M3 | 480 |
| S4 | 920 |
| M4 | 410 |
| S9 | 1010 |
| M9 | 410 |
| S6 | 740 |
| M6 | 300 |
| S7 | 800 |
| M7 | 410 |
| S8 | 800 |
| M8 | 410 |

What is claimed is:

1. A homogenous solid solution consisting essentially of:
   a) a first 2,2,6,6-tetraalkylpiperidinyl group containing compound; and
   b) a second 2,2,6,6-tetraalkylpiperidinyl group containing compound having a higher molecular weight than the first 2,2,6,6-tetraalkylpiperidinyl group containing compound, wherein the ratio a):b) is 1:9 to 3:7.

2. A composition of claim 1 in which component a) contains one to four or N-substituted 2,2,6,6-tetraalkylpiperidinyl group(s).

3. A composition of claim 1 in which the compound of component a) has a molecular weight of 155–800.

4. A composition of claim 1 in which component b) is an oligomeric or polymeric compound having one to four N-unsubstituted or N-substituted 2,2,6,6-tetraalkylpiperidinyl groups per recurring polymer unit.

5. A composition of claim 1 in which the compound of component b) has a molecular weight of 1,000–20,000.

6. A homogenous solid solution consisting essentially of a) and b) in the ratio 1:9 to 3:7 wherein:

a) is

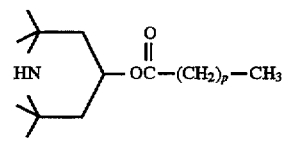

where $p_1$ is 14–16 or

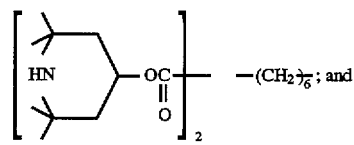

b) is

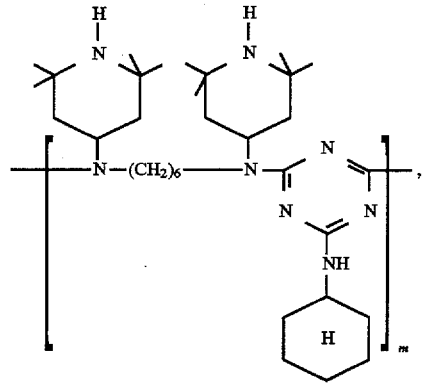

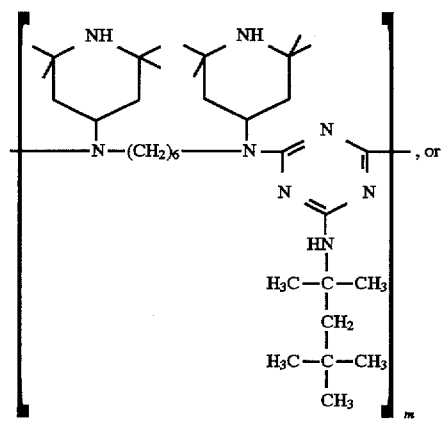

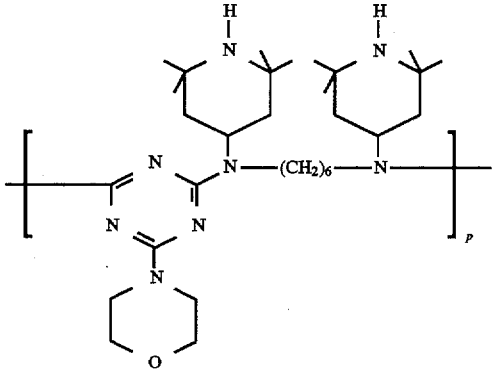

where m is 4–30 and p is 4–30.

7. A process for preparing a solid solution composition defined in claim 1 comprising
   i) mixing 1 mol of component a) with 1–20 mols of component b),
   ii) melting the mixture of step i), and
   iii) cooling the melt of step ii) to form a solid solution.

8. A polymeric composition comprising a polymeric material and a solid solution of claim 1.

9. A method for stabilizing a powder coating composition based on polyurethane, acrylic, alkyd and/or polyester resins, optionally crosslinked with melamine/formaldehyde resins, epoxide resins or polyisocyanates, against the degrading effects of heat and light, which comprises incorporating into said composition a solid solution of claim 1, optionally together with an acid catalyst or compound capable of releasing an acid catalyst.

10. A powder coating composition, based on polyurethane, acrylic, alkyd and/or polyester resins, optionally crosslinked with melamine/formaldehyde resins, epoxide resins or polyisocyanates, containing a solid solution of claim 1.

* * * * *